US006117809A

United States Patent [19]

Sechrist et al.

[11] Patent Number: 6,117,809
[45] Date of Patent: *Sep. 12, 2000

[54] METHOD FOR DECREASING CHLORIDE EMISSIONS FROM A CATALYST REDUCTION PROCESS

[75] Inventors: Paul A. Sechrist, Des Plaines; Delmar W. Robinson, Palatine, both of Ill.

[73] Assignee: UOP LLC, Des Plaines, Ill.

[ * ] Notice: This patent is subject to a terminal disclaimer.

[21] Appl. No.: 08/773,812

[22] Filed: Dec. 19, 1996

Related U.S. Application Data

[63] Continuation-in-part of application No. 08/764,868, Dec. 13, 1996, Pat. No. 5,965,473, which is a continuation-in-part of application No. 08/724,652, Oct. 3, 1996, Pat. No. 5,837,636.
[60] Provisional application No. 60/009,445, Dec. 29, 1995, and provisional application No. 60/005,764, Oct. 20, 1995.

[51] Int. Cl.[7] .............................. B01J 38/42; B01J 20/34
[52] U.S. Cl. .............................. 502/35; 502/53; 208/140
[58] Field of Search ........................ 502/35, 53; 208/140

[56] References Cited

U.S. PATENT DOCUMENTS

| | | | |
|---|---|---|---|
| 2,773,014 | 12/1956 | Snuggs et al. | 196/50 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,803,052 | 4/1974 | Hayes | 502/53 |
| 3,856,662 | 12/1974 | Greenwood | 208/171 |
| 3,939,061 | 2/1976 | Paynter | 208/140 |
| 4,406,775 | 9/1983 | Bailor | 208/140 |
| 4,447,551 | 5/1984 | Fung | 208/140 |
| 4,567,023 | 1/1986 | Greenwood et al. | 422/192 |
| 4,662,081 | 5/1987 | Greenwood | 34/22 |
| 4,665,632 | 5/1987 | Greenwood | 34/168 |
| 5,087,792 | 2/1992 | Cottrell | 502/53 |
| 5,151,392 | 9/1992 | Fettis | 502/35 |
| 5,336,834 | 8/1994 | Zarchy et al. | 585/737 |

*Primary Examiner*—Tom Dunn
*Assistant Examiner*—Peter DiMauro
*Attorney, Agent, or Firm*—John G. Tolomei; Michael A. Moore

[57] ABSTRACT

A method is disclosed for recovering chlorine-containing species from an outlet stream of a zone in which the catalytic metal of a chloride-containing catalyst is reduced. The outlet stream is passed to a sorption zone which contains catalyst and which is maintained at sorption conditions. The catalyst in the sorption zone sorbs the chlorine-containing species from the outlet stream. This method captures and retains within the process the chlorine-containing species that would otherwise be lost from the process and that would need to be replaced by the injection of make-up chlorine-containing species. This method results in a significant savings in capital and operating costs of a catalyst regeneration process that includes a reduction step. This method is adaptable to many catalytic hydrocarbon conversion processes which pass catalyst particles between or among moving bed reaction and regeneration zones.

23 Claims, 2 Drawing Sheets

METHOD FOR DECREASING CHLORIDE EMISSIONS FROM A CATALYST REDUCTION PROCESS

CROSS-REFERENCE TO RELATED APPLICATION

This application is a continuation-in-part of U.S. application Ser. No. 08/764,868, which was filed Dec. 13, 1996 and which claims the benefit of U.S. Provisional Application No. 60/009,445 filed Dec. 29, 1995 and which is now U.S. Pat. No. 5,965,473. U.S. Pat. No. 5,965,473 is a continuation-in-part of U.S. application Ser. No. 08/724,652, which was filed Oct. 3, 1996 and which claims the benefit of U.S. Provisional Application No. 60/005,764 filed Oct. 20, 1995 and which is now U.S. Pat. No. 5,837,636.

FIELD OF THE INVENTION

This invention relates generally to the regeneration of hydrocarbon conversion catalysts in the presence of a chlorine-containing species.

BACKGROUND OF THE INVENTION

Although catalysts for the conversion of hydrocarbons have a tendency to deactivate, usually a catalyst's activity may be restored by one of a number of processes that are known generally as regeneration processes. Regeneration processes are extensively used. What specific steps comprise a regeneration process depends in part on the reason for the deactivation. For example, if the catalyst contains a catalytic metal such as platinum, regeneration usually includes oxidizing the metal by contacting the catalyst with oxygen. In an oxidized state, however, the catalyst metal is generally not in its most catalytically active form for promoting hydrocarbon conversion reactions. Consequently, regeneration usually also includes reducing the oxidized metal by contacting the catalyst with hydrogen. Operating conditions and methods for such catalyst reduction steps are well known. Regeneration processes that include a catalyst reduction step can be carried out in situ, or the catalyst may be withdrawn from the vessel in which the hydrocarbon conversion takes place and transported to a separate regeneration zone for reactivation. Arrangements for continuously or semicontinuously withdrawing catalyst particles from a reaction zone and for reactivation in a regeneration zone are well known.

Many hydrocarbon conversion processes use one or more chlorine-containing species, which are referred to herein as chloro-species, that restore the activity of the catalyst for use in the reaction zone. These chloro-species may be chemically or physically sorbed on the catalyst as chloride. During reduction, however, chloride is usually desorbed or released from the catalyst. The mechanism of reduction with hydrogen produces water. Within a reduction zone of a regeneration process, the catalytic metal is usually reduced at temperatures ranging from 300 to 1000° F. (149 to 538° C.), but temperatures in localized regions may reach 1100° F. (593° C.) or more. Because of these high temperatures and also because of high water concentrations, catalyst chloride is quite readily removed from the catalyst during reduction. Thus, in the reduction step of many regeneration processes, a reduction offgas stream containing chloro-species is withdrawn from the regeneration process. Withdrawal of the chloro-species in the offgas stream poses both catalytic and corrosion concerns. Consequently, several methods have been used for minimizing the effect of the loss of chloride from the catalyst and preventing contamination of the offgas stream with the chloro-species. As for the catalytic concerns, the loss of chloride usually causes temporary catalyst deactivation, which can be reversed by adding make-up chloride to the catalyst. The corrosion concerns can be abated either by scrubbing the reduction offgas stream with an aqueous, basic solution that neutralizes the chloro-species or by adsorbing the chloro-species on an adsorbent. Scrubbing and adsorption are the two methods that are typically used when chloro-species are withdrawn during reduction of reforming catalysts and of catalysts for other hydrocarbon conversion processes, such as dehydrogenation, isomerization, alkylation, and transalkylation.

Although these two methods—scrubbing and adsorption—for decreasing the release of chloro-species during catalyst reduction are useful, they are also expensive to build and troublesome to operate. On the one hand, by introducing an aqueous solution into the offgas stream, scrubbing can actually increase the risk of downstream corrosion unless the alkalinity of the aqueous solution is carefully controlled. Moreover, because the aqueous solution must be replaced periodically, scrubbing gives rise to significant costs for supplying fresh solution and for disposing of the spent solution. On the other hand, although adsorption does not involve the introduction of an aqueous stream, the adsorbent also must be replaced periodically, and the cost of replacement of the adsorbent, including the cost of disposing of spent adsorbent, can far exceed the cost of replacement of the aqueous solution in scrubbing.

The problem of adsorbent replacement is compounded by water in the reduction offgas stream, and as a result traditional adsorbents are not economically viable for adsorbing chloro-species from reduction offgas streams. In order to be economically viable, an adsorbent, while removing a high proportion of the chloro-species from the offgas stream, must adsorb typically from 7 to 8 percent of its weight in chloride. In order to adsorb that amount of chloride, the offgas must have a low water content, typically less than 0.01 mol-% water. Water competes with chloro-species for adsorption sites on the adsorbent, and by occupying sites that would otherwise be occupied by chloro-species, water hinders the adsorption of chloride and hastens replacement of the adsorbent. Thus, if the offgas has a high water content, the adsorbent adsorbs too much water and is incapable of adsorbing a viable amount of chloride. Because water is a common byproduct of reduction of an oxidized metal with hydrogen, reduction offgas streams often have a high water content, typically less than 0.05 but possibly from 1 to 10 mol-%, depending on the flow rate and composition of the reduction gas and on the metals content of the catalyst. As a consequence, unless the offgas is dried an adsorbent will adsorb only one-third to one-half of the weight of chloride required for economic viability. This, in turn, doubles or triples the frequency of adsorbent replacement, thereby making traditional adsorbents uneconomical. Although in theory the adsorption of water can be mitigated by drying the offgas stream prior to adsorbing the chloro-species, in fact a drier is costly as well as impractical because chloro-species such as hydrogen chloride tend to degrade most desiccants.

Thus, a process is sought for removing hydrogen chloride and other chloro-species from the reduction offgas streams of catalyst regeneration processes without the need for aqueous solutions, adsorbents, and desiccants.

SUMMARY OF THE INVENTION

It has been discovered that a catalyst that has a metal-containing alumina support and that is about to be, but has not yet been, regenerated can sorb chlorine-containing species, which are referred to herein as chloro-species, from an offgas stream that is emitted during catalyst reduction. This discovery makes possible dramatic decreases in both the release of chloro-species and the make-up addition of chloro-species. The observations that led to this discovery were made while contacting catalysts with chloro-species in nitrogen-containing, oxygen-containing, and hydrogen-containing gas streams. It is believed that the same or similar sorption phenomenon of chloro-species occurs in gas streams comprising oxidation agents such as oxygen, reducing agents such as hydrogen, and relatively inert agents such as nitrogen.

In order to take advantage of this property of these catalysts to sorb chloro-species from an outlet stream of a reduction step, a chloride sorption step that can be readily integrated into existing regeneration processes without large capital expenditures or greatly increased complexity is provided. This invention is particularly applicable to regeneration operations that reduce the metal of metal-containing and chloride-containing particles, especially spent naphtha reforming catalysts and spent paraffin dehydrogenation catalysts.

In this invention, a sorption step in combination with a reduction step retains within a hydrocarbon conversion process most of the chloro-species that prior art reduction steps removed or otherwise rejected from the process. This invention uses sorption to capture the chloro-species that would otherwise escape in the outlet stream, which is typically a gas stream, of a catalyst bed that is being reduced. Thus, this invention decreases the risk of condensation of hydrochloric acid and hence corrosion in the downstream equipment, including compressors and heat exchangers, through which the reduction outlet stream usually passes. Compared to prior art processes, this invention is a much improved method of removing chloro-species from the reduction outlet stream. Unlike conventional scrubbing methods, this invention uses sorption to capture chloro-species from the reduction outlet stream. Unlike conventional adsorption methods that use a separate adsorbent which becomes loaded with chloro-species and then is discarded, this invention uses catalyst that has been used to convert hydrocarbons or that is about to be regenerated to capture chloro-species in the reduction outlet stream and to return the chloro-species to the process as chloride on the catalyst. In this way, this invention reuses the captured chloro-species within the process and thereby sustains the chloride level on the catalyst.

It has been discovered that, even though catalyst that has been used to convert hydrocarbons but has not yet been regenerated is like traditional sorbents in that it is capable of sorbing up to, say, only about from 2 to 3 percent of its weight in chloride from a water-containing reduction outlet stream, a process that uses this catalyst to sorb chloro-species from the reduction outlet stream is useful because of the large quantity of catalyst available for sorption. Accordingly, in one of its embodiments, this invention is a process in which catalyst that is about to be regenerated is first passed to a zone that is not at either reaction or regeneration conditions but rather at sorption conditions. There, at sorption conditions, the spent catalyst sorbs chloro-species from the reduction outlet gas stream. Because the reduction outlet gas stream has a relatively high water content, the catalyst sorbs up to, say, only about from 2 to 3 percent of its weight in chloride. The catalyst, having sorbed what chloride it can, is withdrawn from the sorption zone and then is passed to the regeneration zone at regeneration conditions. Thus, whatever additional chloride the catalyst sorbed while at sorption conditions is carried by the catalyst into the regeneration zone, thereby decreasing the need to add make-up chloride to the regeneration zone. Meanwhile, the sorption zone is replenished with a continual stream of catalyst, which is capable of being supplied to the sorption zone at a rate that is more than sufficient to compensate for the fact that the catalyst sorbs only up to about 2 to 3 percent of its weight in chloride. In short, in this invention an abundant quantity of catalyst that is available for sorption more than compensates for what persons skilled in the art would consider a small and uneconomical amount of chloride sorbed by the catalyst. The benefits of this invention for the regeneration process include a decrease in the concentration of chloro-species in the reduction outlet gas stream, a decrease in the rate of addition, if any, of make-up chloro-species to the regeneration zone, and a decrease in the rate of usage and subsequent disposal, if any, of scrubbing solutions or of separate adsorbents.

In regeneration processes as currently commercially practiced, the concentration of chloro-species in the outlet gas stream from a reduction zone in which the platinum is reduced on chlorided platinum alumina catalysts depends on a number of factors, including the platinum and chloride contents of the catalyst and the flow rate and water content of the reduction outlet gas stream. Typically, the reduction outlet gas stream contains from 5 to 1500 mol-ppm hydrogen chloride and less than 5 mol-ppm chlorine. By practicing this invention in which a high proportion of the chlorine and hydrogen chloride in the reduction outlet gas stream is sorbed on the coked catalyst prior to the combustion of the coke, the hydrogen chloride concentration in the reduction outlet gas stream may be reduced to the range of from 1 to 10 mol-ppm and the chlorine concentration may be reduced to the range of less than 1 mol-ppm. The method of this invention can be used to supplement or replace conventional means for removing chlorine and hydrogen chloride from reduction outlet gas streams, such as scrubbing or adsorption. In either case, this invention significantly lowers the substantial costs of building and operating the conventional means of chloro-species removal. In addition, this invention reduces significantly the requirements for adding make-up chloride to the process, because this invention returns to the process a large portion of the chlorine or hydrogen chloride that would otherwise be removed from the process by conventional means of chloro-species removal. Thus, the method of this invention can eliminate or drastically reduce the problems and costs associated with processes that emit a reduction outlet gas stream containing hydrogen chloride or chlorine.

Another benefit of this invention is that in one of its embodiments this invention effectively transforms a hydrogen-containing reduction outlet stream, which is not readily useful in other refining processes because of contamination with hydrogen chloride and water, into a usable source of hydrogen for refining processes such as hydrocracking and hydrotreating. As a minimum, the sorption step removes a portion of the hydrogen chloride from the reduction outlet stream. In addition, the sorption step can remove a portion of the water from the reduction outlet stream. As a result, this invention produces a hydrogen-containing stream that is useful in other hydrocarbon conversion processes that require low concentrations of hydrogen chloride and water in their hydrogen-containing make-up streams.

This invention is applicable to numerous hydrocarbon conversion processes and to their associated catalyst regeneration zones. A basic requirement for using this invention is a reduction zone that contains a metal-containing inorganic oxide that operates in the presence of chloride which is carried out of the reduction zone in the form of a chloro-species by a reduction outlet stream. Examples of chloro-species that are released from the zone and are capable of being recovered by the method of this invention include $Cl_2$ and HCl. Another basic requirement for using this invention is that the inorganic oxide has sorption capacity for the chloro-species. This invention is not limited to any particular type of inorganic oxide; any inorganic oxide, including catalysts or particles containing inorganic oxide, with the necessary capacity may be used. Preferably, the catalyst or particles will recover 50 wt-% and, more preferably, more than 90 wt-%, of the chloro-species in the reduction outlet stream. The typical catalyst or particles for use in this invention comprise inorganic oxides including alumina, activated aluminas, silica alumina, molecular sieves, and alumino-silicate clays such as kaolin, attapulgite, sepiolite, polygarskite, bentonite, and montmorillonite, particularly when the clays have not been washed by acid to remove substantial quantities of alumina. Reference is made to Zeolitic Molecular Sieves, by Donald W. Breck (John Wiley & Sons, 1974), which describes the use and selection of zeolite adsorbents and which is incorporated herein by reference.

The sorption and removal capacity of the catalyst for the chloro-species must exist under a reasonable range of conditions. With respect to the removal capacity, the conditions at which the reduction step of the regeneration process occurs must be conditions that are sufficient to remove chloride from the catalyst. As a practical matter, however, this requirement does not limit the scope of this invention in any significant way. With respect to the capacity of the catalyst to sorb chloro-species, preferably the process conditions of the reduction outlet stream will complement the sorption requirements of the catalyst. In a surprising aspect of this invention, the sorption of chloro-species in the sorption zone is favored by a decrease rather than an increase in the pressure of the sorption zone. Although persons of ordinary skill in the art of sorption processes would have expected that a decrease in pressure would not have been beneficial for the sorption of gaseous chloro-species onto the catalyst or particles, it has been discovered that the opposite is true in the presence of water and at the temperatures of the sorption zone. Based on observations of contacting fresh catalyst with gas streams containing nitrogen, oxygen, water, and chloro-species, it has been discovered that although a decrease in pressure causes the sorption of water from the gas stream onto the catalyst to decrease, the sorption of chloro-species does not decrease, even at the temperatures of the sorption zone. Therefore, a decrease in pressure selectively favors the sorption of chloro-species relative to that of water. It is believed that this same sorption phenomenon would be observed if a gas stream containing chloro-species, water, and a reducing agent such as hydrogen were contacted with catalyst. Consequently, a preferred embodiment of this invention includes a sorption zone that operates at a pressure that is less than the pressure of the reduction zone. This embodiment may be well-suited for those prior art processes in which the catalyst is employed for hydrocarbon conversion at a pressure that is lower than the pressure of the reduction step. In such prior art processes, it is somewhat beneficial first to perform the reduction at a relatively high pressure, then to employ the catalyst in hydrocarbon conversion at a relatively low pressure, and finally to perform the sorption at or below the pressure of the hydrocarbon conversion. All other factors being the same, the favorable increase in sorption that occurs as a result of a decrease in pressure increases as the total pressure of the catalyst beds decreases. Thus, for hydrocarbon conversion processes and regeneration processes that operate at slightly above atmospheric pressure and in which the difference between the hydrocarbon conversion and regeneration pressures is nevertheless relatively great, the benefit of a lower pressure for the sorption zone may be substantial.

This invention is not limited to the recovery and reuse of a single chloro-species, but may include arrangements for the recovery of two or more chloro-species. Preferably, the catalyst in a single sorption zone will sorb all of the various chloro-species that are present in the reduction outlet stream. Where necessary, multiple sorption zones operating at different sorption conditions may be used to recover the various chloro-species from the reduction outlet stream.

It is an object of this invention to improve processes for regenerating hydrocarbon conversion catalysts that use chloro-species.

Another object of this invention is to recover chloro-species that are present during catalyst regeneration.

Still another object of this invention is to produce a hydrogen-containing stream containing sufficiently low concentrations of chloro-species and water that the stream is usable as a source of hydrogen in other refining processes.

A further object of this invention is to decrease the costs that are incurred in not retaining chloro-species within catalyst regeneration processes.

Accordingly, this invention is in one embodiment a method for recovering chloro-species from a process for reducing a metal-containing catalyst. A reduction inlet stream comprising a reducing agent is passed to a reduction zone containing the catalyst that contains the metal and chloride. In the reduction zone at reduction conditions, at least a portion of the metal on the catalyst is reduced and at least a portion of the chloride is removed from the catalyst. A reduction outlet stream comprising the chloro-species is withdrawn from the reduction zone. At least a first portion of the reduction outlet stream is passed to a sorption zone containing the catalyst. In the sorption zone at sorption conditions, at least a portion of the chloro-species is sorbed on the catalyst. A sorption outlet stream having a decreased concentration of the chloro-species relative to the reduction outlet stream is withdrawn from the sorption zone.

In a more limited embodiment, this invention is a method for recovering chloro-species from a reduction outlet stream of a reduction zone of a process for the catalytic conversion of a hydrocarbon feedstock in the presence of metal-containing catalyst particles. A hydrocarbon feedstock is passed to a reaction zone. In the reaction zone, the feedstock is contacted with the catalyst particles containing the metal. A hydrocarbon product is recovered from the reaction zone. The catalyst particles are withdrawn from the reaction zone, and at least a portion of the catalyst particles withdrawn from the reaction zone are passed to a sorption zone. At least a portion of a reduction outlet stream comprising hydrogen and the chloro-species is passed to the sorption zone. In the sorption zone at sorption conditions, the chloro-species are sorbed on the catalyst particles. A sorption outlet stream comprising hydrogen and having a reduced concentration of the chloro-species relative to the reduction outlet stream is withdrawn from the sorption zone. The catalyst particles are passed from the sorption zone to an oxidation zone. At least a portion of the metal on the catalyst particles is oxidized in the oxidation zone. The catalyst particles are passed from the oxidation zone to a reduction zone. A reduction inlet stream comprising hydrogen is passed to the reduction zone. In the reduction zone at reduction conditions, at least a portion of the metal on the catalyst particles is reduced and at least a portion of the chloride is removed from the catalyst particles. The reduction outlet stream is withdrawn from the reduction zone. The catalyst particles are passed from the reduction zone to the reaction zone.

Other objects, embodiments and details of this invention are presented in the following detailed description of the invention.

INFORMATION DISCLOSURE

U.S. Pat. No. 3,652,231 (Greenwood et al.) shows a regeneration apparatus in which a constant-width movable bed of catalyst is utilized. The '231 patent also describes a continuous catalyst regeneration process which is used in conjunction with catalytic reforming of hydrocarbons. U.S. Pat. No. 3,647,680 (Greenwood et al.) and U.S. Pat. No. 3,692,496 (Greenwood et al.) also deal with continuous regeneration of reforming catalyst. The '680 and '496 patents describe the reduction step of a continuous catalyst regeneration process, where the reduction step occurs in a reduction zone situated at the top of a multiple-stage reactor system. The teachings of patents 231, '680, and '496 are hereby incorporated in full into this patent application.

U.S. Pat. No. 5,336,834 (Zarchy et al.) discloses an adsorption zone in combination with a catalytic hydrocarbon conversion process that keeps chlorine-containing compounds in the reaction zone and prevents contamination of product streams with chlorine-containing compounds.

U.S. Pat. No. 3,856,662 (Greenwood) and U.S. Pat. No. 4,567,023 (Greenwood et al) describe apparatus for withdrawing catalyst particles from the bottom of a multiple-stage reactor system. U.S. Pat. No. 4,662,081 (Greenwood) and U.S. Pat. No. 4,665,632 (Greenwood) deal with uniformly distributing a fluid upwardly through a cylindrical bed of a downwardly moving catalyst. The teachings of patents '662, '023, '081 and '632 are hereby incorporated in full into this patent application.

DETAILED DESCRIPTION OF THE INVENTION

This invention can be used to decrease the release of halogen-containing species from any process that uses a reduction zone to reduce a metal that is present on an inorganic oxide that can sorb halogen-containing species and from which halogens can be removed. Although halogens may include fluorine, bromine, and iodine, the preferred halogen is chlorine. Accordingly, this invention is particularly applicable to decreasing the release of chloro-species. The term "chloro-species" herein refers to any molecule that contains chlorine, other than the chloride component or chloride entities that exist on the inorganic oxide. For example, chloro-species include chlorine, hydrogen chloride, chlorinated hydrocarbons with or without oxygen, and compounds containing chlorine and a metal. The term "chlorine" herein refers to elemental chlorine, which exists as a diatomic molecule at standard conditions. The term "chloride" when used alone herein refers to the chloride component or chloride entities that exist on the inorganic oxide. Chloride on the inorganic oxide is believed to exist as various compounds depending on the composition of the inorganic oxide and the surrounding conditions to which the inorganic oxide is exposed. For example, if the inorganic oxide contains alumina, then the chloride may exist on the inorganic oxide as an entity consisting of chlorine, oxygen, hydrogen, and aluminum atoms.

Generally, the inorganic oxide that can sorb and desorb chloro-species is in the form of particles, and preferably the inorganic oxide comprises alumina. The alumina may be present alone or it may be combined with a porous inorganic oxide diluent as a binder material. Alumina having a high surface area is preferred. The alumina may be present in any of its solid phases, but gamma-alumina is preferred. The alumina may also be present as a chemical combination with other elements such as silica-aluminas or alumino-silicate clays. Because many hydrocarbon conversion catalysts comprise alumina, the hydrocarbon conversion catalysts that may be used with this invention are numerous. They include catalysts for reforming, dehydrogenation, isomerization, alkylation, transalkylation, and other catalytic conversion processes. These catalysts are well known. See, for example, U.S. Pat. Nos. 2,479,110 and 5,128,300 (reforming); 4,430,517 and 4,886,928 (dehydrogenation); 2,999,074 and 5,017,541 (isomerization); 5,310,713 and 5,391,527 (alkylation); and 3,410,921 (transalkylation). The teachings of these patents are incorporated herein by reference.

The metal can comprise any metal that can exist on an inorganic oxide in an oxidation state that can be reduced. In particular, the metal can be any of the metals that are described in the references for hydrocarbon conversion catalysts incorporated hereinbefore. This invention is well-suited for metals in Group VIII B of the Periodic Table, and especially well suited for the Group VIII B noble metals (e.g., platinum, iridium, rhodium, and palladium). This invention is also suitable for metals in Group I B through Group VII B, including molybdenum, rhenium, zirconium, chromium, and manganese. This invention is also suitable for metals in Group I A through Group VI A, including potassium, calcium, magnesium, aluminum, gallium, germanium, indium, tin, and lead.

It is believed that the most widely-practiced processes that produce reduction outlet streams containing chloro-species and that also employ alumina- and metal-containing particles are hydrocarbon conversion processes. The most widely practiced catalytic hydrocarbon conversion process to which the present invention is applicable is catalytic reforming. Therefore, the discussion of the invention herein will refer to its application to a catalytic reforming reaction system. It is not intended that this limit the scope of the invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (82° C.) and an end boiling point of about 400° F. (204° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII B noble metals (e.g., platinum, iridium, rhodium, and palladium) and a halogen combined with a porous carrier, such as a refractory inorganic oxide. The halogen is normally chloride. Alumina is a commonly used carrier. The preferred alumina materials are known as gamma, eta, and theta alumina, with gamma and eta alumina giving the best results. An important property related to the performance of the catalyst is the surface area of the carrier. Preferably, the carrier will have a surface area of from 100 to about 500 $m^2/g$. It has been discovered that the greater the surface area of the carrier, the greater is the capacity of the catalyst to sorb chloride according to the method of this invention. The particles are usually spheroidal and have a diameter of from about $\frac{1}{16}$th to about $\frac{1}{8}$th inch (1.6–3.2 mm), though they may be as large as $\frac{1}{4}$th inch (6.35 mm). In a particular regenerator, however, it is desirable to use catalyst particles which fall in a relatively narrow size range. A preferred catalyst particle diameter is $\frac{1}{16}$th inch (1.6 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be regenerated before it can be reused in a reforming process.

The present invention is applicable to a reforming process with at least one fixed-or moving-bed reaction zone and at least one fixed- or moving-bed regeneration zone. This invention is preferably applied to a reforming process with a moving bed reaction zone and a moving bed regeneration zone. Regenerated catalyst particles are fed to a reaction zone, which may be comprised of several subzones, and the particles flow through the zone by gravity. Catalyst is withdrawn from the bottom of the reaction zone and transported to a regeneration zone. Catalyst that is withdrawn from the reaction zone is termed spent catalyst. In the regeneration zone, a multi-step regeneration process is used to regenerate the catalyst to restore its full reaction promoting ability. Catalyst flows by gravity through the various regeneration steps and then is withdrawn from the regeneration zone and furnished to the reaction zone. Catalyst that is withdrawn from the regeneration zone is termed regenerated catalyst. Arrangements are provided for adding fresh catalyst as make-up to and for withdrawing spent catalyst from the process. Movement of catalyst through the zones is often referred to as continuous though, in practice, it is semicontinuous. By semicontinuous movement it is meant the repeated transfer of relatively small amounts of catalyst at closely spaced points in time. For example, one batch every twenty minutes may be withdrawn from the bottom of a reaction zone and withdrawal may take five minutes, that is, catalyst will flow for five minutes. If the catalyst inventory in a zone is relatively large in comparison with the batch size, the catalyst bed in the zone may be considered to be continuously moving. A moving bed system has the advantage of maintaining production while the catalyst is removed or replaced.

Although the multi-step regeneration process that is used to regenerate the catalyst often comprises three, four, or more individual steps, for the purposes of describing this invention the regeneration process can be thought of generally as comprising two steps, an oxidation step and a reduction step. The oxidation step produces oxidized catalyst having at least a portion of its metal with an oxidation number greater than zero. It is uncommon in reforming catalyst regeneration processes that the operating conditions of the oxidation step effect only oxidation of the metal and have no other effect on the catalyst. Nevertheless, the metal of a catalyst that is in a reduced state may be oxidized by contacting the catalyst with a stream containing an oxidizing agent, and the oxidizing agent and the oxidizing conditions can be selected by persons of ordinary skill in the art so that the reaction which oxidizes the metal is promoted and any other reactions or effects on the catalyst are minimized.

It is more common in reforming catalyst regeneration processes, however, that the operating conditions of the oxidation step are selected primarily to achieve some purpose other than oxidation of the metal, and oxidation of the metal is a side reaction, an ancillary effect, or an intermediate step. For example, the oxidation step may comprise a coke combustion step in which the coke on a spent reforming catalyst is combusted by contacting the catalyst with a hot circulating gas stream containing a low concentration of oxygen. Although the main purpose of a coke combustion step is to oxidize the coke deposits, the combustion conditions are generally sufficient to oxidize the metal on the catalyst as well. Another example of an oxidation step is a metal dispersion step, in which agglomerated metal on a reforming catalyst is dispersed by contacting the catalyst with a hot stream containing chlorine and oxygen. Generally, the redispersion conditions are sufficient to oxidize, or to further oxidize, metal on the catalyst, even if the catalyst has undergone a prior coke combustion step. A third example of an oxidation step is a drying step in which a reforming catalyst is dried to remove water by contacting the catalyst with a hot stream containing oxygen, such as air. In theory, such drying conditions are sufficient not only to remove water from the catalyst but also to oxidize the metal on the catalyst. In practice, however, such a drying step is not performed on a catalyst unless the catalyst has already undergone either a coke combustion step, a metal redispersion step, or both, and thus some of the metal on the catalyst that is to be dried may be already partially or fully oxidized. Accordingly, the extent to which such a subsequent drying step can or will oxidize the catalyst may be limited. Nevertheless, the catalyst that exits a drying step that employs hot air as the drying medium generally has its metal in an oxidized state.

The reduction step produces reduced catalyst having its metal in an oxidation state that is lower or reduced relative to the oxidation state of the metal on the catalyst from the oxidation step. It is common in reforming catalyst regeneration processes that the operating conditions of the reduction step are selected primarily to reduce the metal to an oxidation number of zero, even though other side reactions or collateral effects may occur on the catalyst during the reduction step. The kinds of reactions and other effects that occur on the catalyst depend on several factors including the composition of the catalyst, the reduction conditions, the arrangement of the reduction zone, and the reducing agent. Although $C_1$–$C_5$ hydrocarbons and even carbon monoxide can in principle be used as a reducing agent, the most widely used agent for reducing the metal of reforming catalysts is molecular hydrogen. Accordingly, the reducing step generally comprises contacting the catalyst with a hot hydrogen-rich gas stream. By hydrogen-rich, it is meant a stream having a concentration of hydrogen generally of more than 50 mol-%, and preferably of more than 75 mol-%. The product separation facilities of a reforming process produces a recycle gas stream having a hydrogen concentration generally of from 65 to 85 mol-% that is typically recycled to the reaction zone and a net gas stream having a hydrogen concentration generally of from 75 to 95 mol-% that is typically not recycled to the reaction zone. The balance of either stream is generally $C_1$–$C_6$ paraffinic hydrocarbons, and either stream usually contains less than 15 mol-ppm hydrogen chloride. Depending on the conditions and arrangement of the reduction zone, a portion of either stream may be suitable for use as the reduction inlet stream for reducing the reforming catalyst.

Reforming catalysts can be reduced over a wide range of conditions that depend on factors such as the composition of the catalyst, the operating conditions of the reforming process, and the operating conditions of the other steps of the multi-step catalyst regeneration process. Where hydrogen is the reducing agent, the reduction temperatures are maintained typically in the range of 250–1050° F. (121–566° C.) and preferably in the range of 392–662° F. (200–350° C.) and the reduction pressure is maintained typically in the range of 50–200 psi(g) (3.5–14 kg/cm$^2$(g)).

In the case of reforming catalyst particles being reduced by a hydrogen-rich reduction gas, the reduction zone in which the catalyst particles are contacted with the reducing gas can be any of the well-known arrangements for contacting solid particles with a gas stream. When using the method of this invention in a continuous or semicontinuous catalyst regeneration zone, the catalyst is contacted with a hot reduction inlet gas stream in a zone and a reduction outlet gas stream that contains chloro-species is withdrawn from the zone. Where the reduction zone comprises a moving catalyst bed, the direction of the gas flow is preferably countercurrent relative to the direction of movement of the catalyst, but the direction of gas flow can also be cocurrent, crosscurrent, or a combination of countercurrent, cocurrent, and crosscurrent. The shape of the catalyst bed can be rectangular, annular, spherical, or any suitable shape, but the preferred shape is cylindrical. The distributor for the gas flow to the catalyst bed may be of any suitable type, but preferably it is an annular distributor of the type disclosed in U.S. Pat. Nos. 4,662,081 (Greenwood) and 4,665,632 (Greenwood), the teachings of which are incorporated herein by reference.

As described previously, the reduction inlet gas stream of a reforming catalyst regeneration process generally contains from 65 to 95 mol-% hydrogen and from 5 to 35 mol-% $C_1$–$C_6$ paraffinic hydrocarbons, depending on whether a portion of the recycle gas stream or a net gas stream is employed as the reduction inlet gas stream. The mechanism of metal reduction results in oxidation of hydrogen to water. Generally, less than one-half of the hydrogen in the reduction gas is consumed in the reduction of the metal. Although some of the water that is produced on the catalyst by reduction may sorb and remain on the catalyst, the capacity of the reforming catalyst to sorb water is generally insufficient to retain much of the water of reduction, especially at the elevated temperatures that are typical of reduction conditions. Accordingly, the reduction outlet gas stream generally contains most of the water of reduction. Generally, the reduction outlet gas stream contains from 60 to 90 mol-% hydrogen, from 5 to 35 mol-% $C_1$–$C_6$ paraffinic hydrocarbons, and from 0.1 to 0.2 vol-% water. To the extent that any of the catalyst metal is reduced by the light hydrocarbons rather than by hydrogen, the reduction outlet gas stream may contain trace amounts of carbon oxides or compounds comprising carbon, hydrogen and oxygen.

In addition, the reduction outlet stream contains a chloro-species, such as hydrogen chloride, chlorine, or other volatile chlorine-containing compounds. Although some of the chloro-species in the reduction outlet stream may be due to the presence of chloro-species in the reduction inlet gas, the reduction conditions are sufficient to release a portion of the chloride from the catalyst, in part because of the reduction temperature and pressure and in part because water that is produced in reduction because water competes with chloride for sorption on the catalyst. The concentration of hydrogen chloride in the reduction outlet stream is commonly from 5 to 300 mol-ppm, and more commonly from 30 to 100 mol-ppm. The concentration of chlorine in the reduction outlet stream is commonly less than 5 mol-ppm.

Sulfur, usually in the form of hydrogen sulfide, is often present in the recycle gas stream and net gas stream of commercial reforming processes. Reforming feedstocks are often contaminated with low concentrations of sulfur, some of which are converted to hydrogen sulfide, which appear in the recycle gas stream and net gas stream of the reforming process. Hydrogen sulfide can harm the performance of the catalyst by attenuating the catalytic functions of the metal and the halogen on the catalyst. In order to avoid these harmful effects, it is preferred that the sulfur concentration of the hydrocarbon feedstock be maintained as low as possible in order to minimize the presence of sulfur in the recycle gas and net gas, and hence in the reduction inlet stream.

Generally, a preferred method of operating this invention is to minimize the flow rate of the reduction outlet stream to the sorption zone, because a decrease in the flow rate of the reduction outlet stream generally decreases the capital and operating expenses of the sorption zone. Moreover, at a given set of sorption conditions, a decrease in the flow rate of the reduction outlet stream generally results in an increase in the concentration of chloro-species in the sorption outlet stream. The flow rate of the reduction outlet stream depends primarily on the flow rate of the reduction inlet stream, which in turn depends on many variables that directly relate to reduction, such as the flow rate of catalyst, hydrogen content of the reduction inlet stream, metal and water content of the catalyst, temperatures of the entering catalyst and reduction inlet streams, and temperature and pressure of reduction. Accordingly, to the extent that these reduction variables can be optimized with a view toward decreasing the flow rate of the reduction outlet stream, the capital and operating expenses of practicing this invention can also be decreased.

When using the method of one embodiment of this invention, at least a portion of the reduction outlet stream is passed to a sorption zone which uses spent catalyst particles, which have not yet passed to the oxidation zone, to remove chloro-species from the reduction outlet gas. Unlike prior art processes, the method of this invention does not use a separate adsorbent to adsorb the chloro-species from the reduction outlet gas stream, but instead this invention uses the catalyst particles themselves for the sorption. The sorption zone can be any of the well-known arrangements for contacting solid particles with a gas stream and sorbing components from the gas stream onto the solid particles. Preferably, the sorption zone comprises a moving catalyst bed. Where the sorption zone is a moving bed, the direction of the gas flow is preferably countercurrent relative to the direction of movement of the catalyst, but the direction of gas flow can also be cocurrent, crosscurrent, or a combination of countercurrent, cocurrent, and crosscurrent. The shape of the catalyst bed can be rectangular, annular, spherical, or any suitable shape, but the preferred shape is cylindrical. The distributor for the gas flow to the catalyst bed may be of any suitable type, but preferably it is an annular distributor of the type disclosed in U.S. Pat. Nos. 4,662,081 (Greenwood) and 4,665,632 (Greenwood).

Although some of the reduction outlet stream passes to the sorption zone, it is not a necessary element of the invention that all of the reduction outlet stream pass to the sorption zone. For example, a portion of the reduction outlet stream may bypass the sorption zone and instead pass to the product separation facilities of the reforming process from which, as described previously, are recovered the recycle gas stream and the net gas stream, either of which may be suitable for use as the reduction inlet stream. Thus, a portion of the reduction outlet stream may be used to form at least a portion of the reduction inlet stream.

The sorption zone is operated at sorption conditions effective to sorb at least a portion of the chloro-species from the reduction outlet gas stream and to produce chlorided spent catalyst, which is referred to herein simply as chlorided catalyst. The chloride content of the spent catalyst entering the sorption zone may be as much as 5% by weight of the catalyst weight, but from 0.1 to 2.0% is a more typical amount. Although the spent catalyst particles that sorb chloro-species in the sorption zone have a higher coke content than fresh catalyst particles, it has been recognized that the presence of coke has a relatively minor effect on the surface area of the catalyst particles and spent catalyst particles have surprisingly similar capabilities for chloride retention as fresh, oxidized, and reduced catalyst particles. Thus, in order for sorption of chloro-species to occur in the sorption zone the operating conditions in the sorption zone must be more favorable for sorption of chloro-species than the operating conditions of the reduction zone. Generally, these more favorable conditions in the sorption zone include a decreased temperature, a decreased pressure, or a decreased water content of the gas that contacts the catalyst. A combination of these more favorable conditions may be employed. Preferably, the sorption zone operates at a decreased temperature relative to the reduction zone.

A cooler temperature in the sorption zone relative to the reduction zone can achieved in a variety of ways. Although the catalyst can be cooled prior to entering the sorption zone or the sorption zone may be equipped with cooling means to cool the reduction outlet gas stream or catalyst within the sorption zone, the preferred method of maintaining a cooler temperature in the sorption zone is by cooling the reduction outlet gas stream after leaving the reduction zone and prior to entering the sorption zone. The temperature of the sorption zone is generally from 150 to 900° F. (66 to 482° C.) and preferably from 300 to 500° F. (149 to 260° C.). Accordingly, in order to cool the reduction outlet gas stream any suitable cooling means can be used, but an air-cooled shell-and-tube heat exchanger having the reduction outlet gas stream within the tubes is preferred. After cooling, the temperature of the reduction outlet gas stream is generally from 150 to 900° F. (66 to 482° C.) and preferably from 300 to 500° F. (149 to 260° C.). In adapting this invention to a regeneration process that already uses a prior art scrubbing or adsorptive process and that already has an existing indirect cooler for cooling the reduction outlet gas stream entering the scrubber or the adsorptive bed, that existing cooler can be used effectively to cool the reduction outlet gas stream. In order to maximize heat integration and the energy efficiency of the reduction zone, the reduction outlet gas stream can be cooled by exchanging heat with the reduction inlet gas stream entering the reduction zone. Thus, in commercial reduction zones where the flow rate of the reduction outlet gas stream is usually from 95 to 100% of the flow rate of the reduction inlet gas stream, a large portion of the required duty to heat the reduction inlet gas stream to reduction temperatures can be supplied by the reduction outlet gas stream. If after heat exchanging the temperature of the reduction outlet gas stream is still higher than the desired temperature for passing to the sorption zone, then a trim reduction outlet gas stream cooler may be employed. Likewise, if the reduction inlet gas stream has not been sufficiently heated, then a trim reduction inlet gas stream heater may be used to achieve the desired reduction zone inlet temperature. The temperatures in the sorption zone and in any coolers if employed are preferably maintained sufficiently above the dew point temperature of the gas in order to minimize the possibility of condensing corrosive acidic liquid in any equipment. The temperature of the spent catalyst particles entering the sorption zone is generally from 150 to 900° F. (66 to 482° C.) and preferably from 300 to 500° F. (149 to 260° C.).

A lower pressure in the sorption zone relative to the reduction zone can be achieved by numerous methods, the simplest being a pressure-reducing valve located in the conduit for the reduction outlet gas stream between the reduction zone and the sorption zone. The pressure of the sorption zone is generally from 0 to 500 psi (0 to 3447 kPa) absolute and preferably from 15 to 100 psi (103 to 689 kPa). The pressure of the sorption zone is generally from 5 to 100 psi (34 to 689 kPa), and preferably from 15 to 50 psi (103 to 344 kPa) less than the pressure of the reduction zone. Embodiments of this invention where the pressure of the sorption zone is less than the pressure of the reduction zone are especially adaptable to hydrocarbon processing units with continuous catalyst regeneration sections where the pressure of the first reaction zone into which catalyst passes after reduction is greater than the pressure of the last reaction zone through which the catalyst passes prior to oxidation. In these embodiments, the pressure of the reduction zone is preferably maintained approximately at the pressure of the first reaction zone, the pressure of the sorption zone is preferably maintained approximately at or below the pressure of the last reaction zone, and the pressure of the chlorided catalyst is increased to the pressure of the reduction zone, either after sorption or after oxidation, by conventional means such as a valved or valveless lock hopper.

A decrease in the water content of the reduction outlet gas stream promotes sorption of chloro-species by decreasing the water that is present and capable of competing with the chloro-species for sorption on the spent catalyst particles. It is believed, however, that drying the reduction outlet gas steam prior to its entering the sorption zone will not be necessary in many processes to which this invention is applied because typical catalysts are capable of sorbing chloro-species from reduction outlet gas streams that contain up to 10 mol-% water, and possibly more than 10 mol-% water. Nevertheless, drying the reduction outlet gas stream can increase the sorption of chloro-species in the sorption zone. Water in the reduction outlet gas stream can be removed by passing the reduction outlet gas stream through an adsorbent such as silica gel that preferentially adsorbs water but not chloro-species. Although silica gel deteriorates over time in the presence of water and some chloro-species, a bed of silica gel can be sacrificed to remove water from the reduction outlet gas stream and then replaced when the silica gel becomes unusable.

The ability of the catalyst to sorb chloro-species in the sorption zone can also be enhanced by drying the spent catalyst particles prior to entering the sorption zone. Water that is already sorbed on the spent catalyst particles before the particles enter the sorption zone occupies sites that would otherwise be available for sorption of chloro-species. Thus, as with drying the reduction outlet gas stream, drying the spent catalyst particles can increase the sorption of chloro-species in the sorption zone. The water content of the spent catalyst particles entering the sorption zone is generally less than 1 wt.-% and preferably less than 0.1 wt.-%. This embodiment of this invention, where the spent catalyst entering the sorption zone has a lower water content than reduced catalyst leaving the reduction zone, is particularly well-suited to typical hydrocarbon conversion process. In a typical hydrocarbon conversion process such as reforming, the operating conditions of the reaction zone are usually drier than the operating conditions of the reduction zone. Consequently, spent catalyst particles leaving the reaction zone typically have a lower water content than reduced catalyst particles entering the reaction zone. For example, a typical spent reforming catalyst has a water content that is usually less than 0.1 wt-%, and for that reason the water content of spent reforming catalyst is neither a significant factor nor an important operating variable affecting chloride sorption. Thus, in effect the reaction zone itself dries the catalyst particles and a separate drying step is not necessary. Water that is removed from the catalyst particles in the reaction zone ultimately leaves the reaction zone in the reaction zone effluent stream.

Sorption conditions also include a gas hourly space velocity of generally from 5 to 20000 $hr^{-1}$ and preferably from 10 to 1000 $hr^{-1}$, and a particle residence time of generally from 0.1 to 10 hours and preferably from 2 to 4 hours. Persons skilled in the art are aware that the temperature within the sorption zone is influenced not only by the temperatures of but also by the thermal mass flow rates of the reduction outlet gas stream and spent catalyst particles. Thus, in order to achieve a desired sorption temperature, it may be necessary to adjust the flow rates of reduction outlet gas stream and spent catalyst particles relative to each other. Although in principle the heat of sorption of the chloro-species on the spent catalyst particles also influences the temperature of the sorption zone, it is believed that the heat of sorption is not a significant factor relative to the flow rates and temperatures of the streams entering and leaving the sorption zone.

Figure 1:
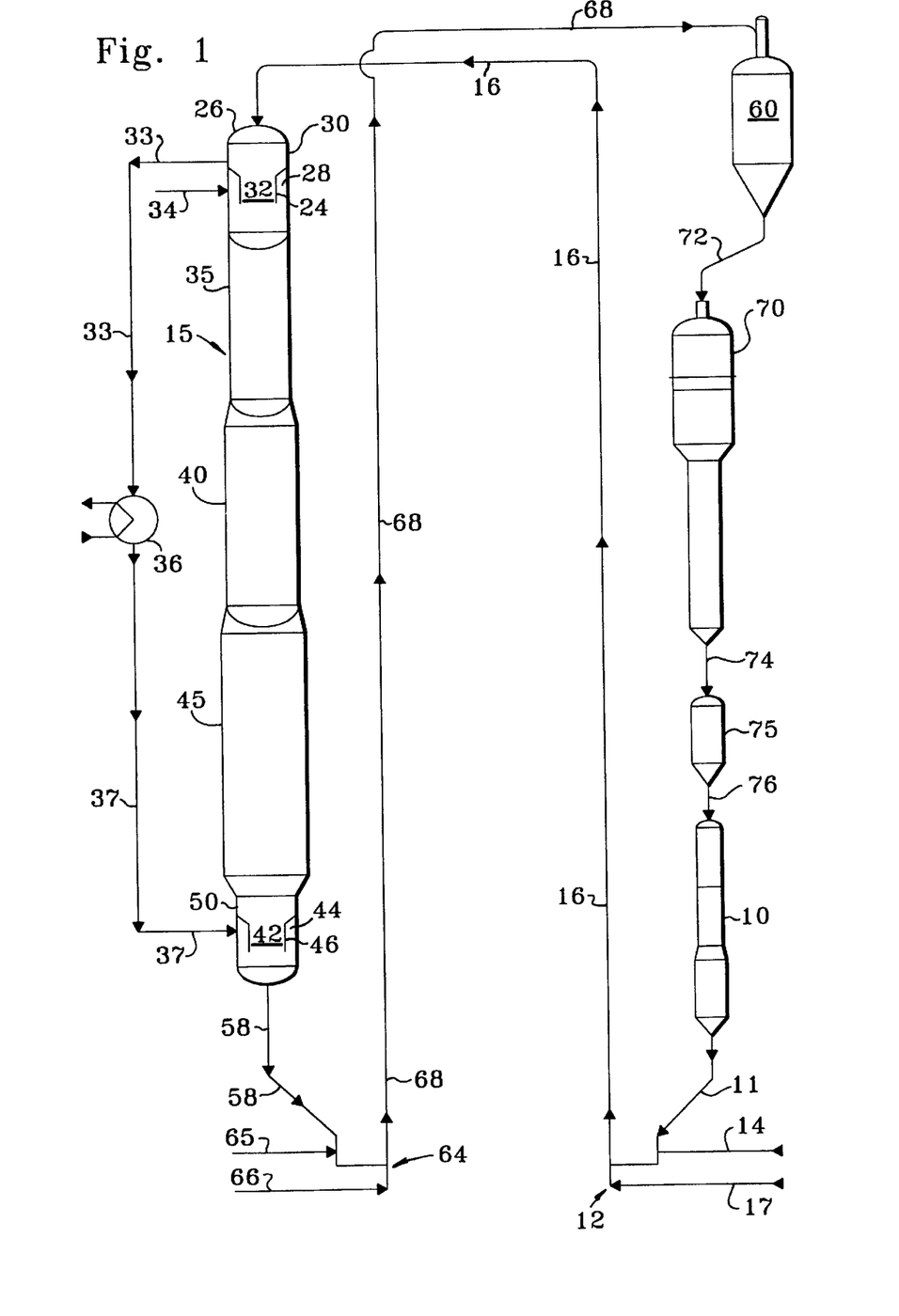
FIG. 1 shows an embodiment of the present invention.

FIG. 1 illustrates a reactor and regenerator system for a reforming reaction zone that uses the sorption system of this invention to remove chloro-species from the reduction outlet gas stream of a reduction zone. Starting first with the flow of hydrocarbons, a straight-run naphtha gasoline fraction boiling in the 200–400° F. (93–204° C.) range is charged to the process and combined with a hydrogen-rich recycle gas stream from conventional product separation facilities not shown. The reactant stream is heated and charged to a first reforming reactor 35. First reforming reactor 35 is in a stacked reactor arrangement 15 and is in vertical alignment with a second reforming reactor 40 and a third reforming reactor 45. Catalyst particles are also charged to first reforming reactor 35, as described hereinafter. The three reforming reactors 35, 40 and 45 are typically maintained at a temperature of from 850 to 1000° F. (454 to 538° C.) and a pressure of from 50 to 200 psi (345 to 1379 kPa) gauge. The reactant stream passes through the catalyst bed of first reforming reactor 35. An effluent stream is withdrawn from first reforming reactor 35, is reheated in a heater not shown, and thereafter is charged to the second reforming reactor 40. An effluent stream is withdrawn from second reforming reactor 40, is reheated in a heater not shown, and is charged to the third reforming reactor 45. An effluent stream is withdrawn from the third reforming reactor 45 and is passed to the conventional product separation facilities for recovery of high octane product such as a reformate having a clear octane number rating of about 95, a hydrogen-rich recycle gas stream that is recycled to the reactor system, and a hydrogen-rich net gas stream that is compressed and withdrawn from the process. Where a gas stream having a higher hydrogen concentration than the recycle gas steam is desired or necessary, a portion of the net gas stream can be recycled to the reactor or regeneration system.

Turning next to the movement of catalyst, a lower line 11 supplies catalyst particles that have been oxidized but have not been reduced to a nonmechanical valve 12. A regulating fluid preferably comprising hydrogen enters valve 12 through a line 14 at a rate that regulates the transfer of oxidized catalyst particles through the valve 12 into a lift line 16. Nonmechanical valve 12 can take on forms such as L valves, J valves, and K valves. Nonmechanical valves are well known, and further information on the operation of such valves can be found in an article titled, "L Valves Characterized for Solid Flow," HYDROCARBON PROCESSING, March 1978, page 149, in a text titled GAS FLUIDIZATION TECHNOLOGY, edited by D. Geldart, John Wiley & Sons, 1986, and in U.S. Pat. No. 4,202,673, the teachings of which are hereby incorporated by reference. As oxidized catalyst particles enter lift line 16, a lift fluid which preferably comprises hydrogen enters the bottom of the lift line through a line 17 and transports the catalyst particles upwardly through lift line 16 to the top 26 of the stacked reactor arrangement 15, which the catalyst particles, regulating fluid, and lift fluid enter. The regulating fluid and the lift fluid are preferably a portion of the net gas stream that has been recycled from the above-mentioned product separation facilities.

Catalyst particles flow from the top to the bottom of the stacked reactor arrangement 15, passing first to a reduction zone 30 where the oxidized catalyst particles are reduced. Reduction zone 30 is shown in vertical alignment with the reforming reactors in the stacked reactor arrangement 15. The regulating fluid and the lift fluid disengage from the entering catalyst in an upper portion of the reduction zone 30, and exit the reduction zone 30 through a line 33. The catalyst particles that enter the reduction zone 30 typically are at a temperature of from 200 to 500° F. (93 to 260° C.) and have a water content less than 1 wt-%, and preferably less than 0.5–0.7 wt-%. A reduction inlet gas stream, which comprises a portion of the net gas stream from the above-mentioned product separation facilities, is passed through a heater or heat exchanger, not shown, and through a line 34 into the reduction zone 30. The catalyst particles flow downwardly through the reduction zone 30 in a moving packed bed 32. The catalyst bed 32 in the reduction zone 30 is formed in part by an annular baffle 24. As will be described in more detail hereinafter, reduction gas enters reduction zone 30 through the line 34, is distributed by the annular baffle 24, passes through the catalyst bed 32, and exits through the line 33.

Catalyst particles pass downwardly from the bottom of reduction zone 30 through multiple stages of reaction, shown in FIG. 1 as reforming reactors 35, 40, and 45, in which process fluids contact the catalyst particles. Details of the contacting beds and other internals of the stacked reactor arrangement 15 are well known to those skilled in the art and permit continuous or intermittent flow of the catalyst particles from the top 26 of the stacked reactor arrangement 15 to a lower retention chamber 50 at the bottom of the stacked reactor arrangement 15.

Lower retention chamber 50 is shown in vertical alignment with the reforming reactors 30, 40, and 45 in the stacked reactor arrangement 15. Spent catalyst particles containing coke deposits flow from the bottom of the third reforming reactor 45, enter the lower retention chamber 50, and flow downwardly in a moving packed bed 42. The catalyst bed 42 is formed in part by an annular baffle 46. The coke content of the spent catalyst entering the catalyst bed 42 could be as much as 20% by weight of the catalyst weight, but from 3 to 8% is a more typical content. The chloride content of the spent catalyst entering the catalyst bed 42 could be as much as 5% by weight of the catalyst weight, but from 0.8 to 1.2% is a more typical content. As will be described in more detail hereinafter, a cooled reduction outlet gas stream comprising chloro-species enters lower retention chamber 50 through a line 37, passes through the catalyst bed 42, and passes into third reforming reactor 45. In catalyst bed 42, hydrocarbons are purged from the catalyst, the catalyst is cooled from reaction temperature to sorption temperature, and the chloro-species are sorbed from the cooled reduction outlet gas stream by the catalyst. If the reduction outlet gas stream is sufficiently dry and the contact time in the catalyst bed 42 is sufficiently long, then the chloride content of the chlorided catalyst leaving the catalyst bed 42 could be as much as 3 to 7% by weight of the catalyst weight depending on the type of catalyst, but from 0.8 to 1.2% by weight is a more typical amount.

Chlorided catalyst particles containing coke deposits and sorbed chloride flow from the bottom of the stacked reactor arrangement 15 through a lower line 58 that displaces hydrogen and hydrocarbons from the stream of chlorided catalyst particles to prevent any carry-over of hydrogen and hydrocarbon to the regenerator side of the process. At the bottom of lower line 58, a nonmechanical valve 64 operates in a manner similar to that described for nonmechanical valve 12 to transfer chlorided catalyst particles upwardly through a lift line 68. A regulating fluid enters valve 64 through a line 65 and a lift fluid enters the bottom of the lift line 68 through a line 66.

Chlorided catalyst particles travel up through lift line 68 in a manner similar to that described for lift line 16 to a disengaging vessel 60. Catalyst flows downwardly through the disengaging vessel 60 and a regeneration vessel 70 which receives catalyst from the disengaging vessel 60 via a line 72. The disengaging vessel 60 maintains a volume of catalyst to balance transitory differences in the flow that may occur during intermittent transport of catalyst through the stacked reactor arrangement 15 and the regenerator vessel 70. After removal of coke and oxidizing of catalyst particles in the regeneration vessel 70, a line 74 transfers oxidized catalyst to a nitrogen seal drum 75. A line 76 transfers oxidized catalyst from the nitrogen seal drum to a lock hopper arrangement 10. The nitrogen seal drum 75 and the lock hopper arrangement 10 control the transfer of oxidized catalyst back to the stacked reactor arrangement 15 via the previously described lift arrangement. The nitrogen seal drum 75 and the lock hopper arrangement 10 also displace oxygen gas from the flowing stream of oxidized catalyst particles to prevent any carry-over of oxygen to the reactor side of the process. Lock hopper and seal drum arrangements are well known to persons of ordinary skill in the art and may be used in any of their current well-known forms to supply a flow of oxidized catalyst into lower line 11.

Looking next to the flow of gas streams to and from the reduction zone 30, a reduction inlet gas stream enters the reduction zone 30 through the line 34 to a space 28 defined by the annular baffle 24 and the wall of reduction zone 30. The reduction inlet gas stream is a portion of the net gas stream from the above-mentioned product separation facilities. The reduction inlet gas stream is distributed downwardly through the space 28. At the bottom of the annular baffle 24, the reduction inlet gas stream reverses direction and flows inwardly and upwardly into the reduction catalyst bed 32. Thus, the reduction inlet gas stream passes through the reduction catalyst bed 32 countercurrently to the movement of the catalyst. The flow rate of hydrogen supplied to the reduction zone 30 by the reduction inlet gas stream is generally greater than the stoichiometric rate of hydrogen in order to reduce the catalytic metals on the catalyst. A reduction outlet gas stream comprising hydrogen that was not consumed in the reduction reactions and water that was produced by the reduction reaction exits the top of the reduction zone catalyst bed 32. The reduction outlet-gas stream combines with the regulating and lift fluids to form a combined reduction outlet gas stream, which exits the reduction zone 30 through the line 33.

The arrangement of a reduction zone as shown in FIG. 1 in which an annular baffle distributes a reducing gas through a catalyst bed is only one of several possible reduction zone arrangements to which this invention can be applied. It is not essential to the successful use of this invention that any one particular reduction zone arrangement be employed. In selecting an arrangement for the reduction zone, a person skilled in the art should consider a number of factors including the catalyst, the reducing gas, the desired temperature, the necessary capital, and the available utilities. For instance, one possible selection is a reduction zone arrangement that would be more expensive to build but would not require a separate reduction inlet gas stream. Such an arrangement is one that employs the hydrogen-rich regulating and lift fluids, rather than a separate reduction inlet gas stream, to reduce the oxidized catalyst. Although in such an arrangement the oxidized catalyst is not contacted by a heated stream, the catalyst must nevertheless be heated to reduction temperatures. This heating can be accomplished in an indirect heat exchanger such as shell-and-tube heat exchanger, by using one of the hot process streams, such as the combined feed stream to the first reforming reactor, to provide the necessary heat. This is merely one of several possible arrangements for the reduction zone, and the choice of one particular arrangement over another is not critical to the successful operation of this invention.

The operating conditions of the reduction zone 30 are sufficient to reduce the oxidized platinum metal of the oxidized catalyst. The reduction temperatures are maintained typically in the range of from 250 to 1050° F. (121 to 566° C.) and preferably in the range of from 392 to 662° F. (200 to 350° C.). The reduction pressure is maintained typically in the range of from 50 to 200 psi (3.5 to 14 kg/cm$^2$) gauge and preferably in the range of from 3 to 30 psi (0.2 to 2 kg/cm$^2$) higher than the pressure of the first reforming reactor 35. The reduction conditions are also sufficient to release chloride from the catalyst. Thus, in addition to hydrogen and water, the reduction outlet gas stream contains chloro-species including hydrogen chloride and chlorine.

The combined reduction outlet gas stream flows through the line 33 to a cooler 36, and a cooled reduction outlet gas stream is withdrawn from cooler 36. Typically, cooler 36 reduces the temperature of the combined reduction outlet gas stream to a temperature at which the catalyst in sorption bed 42 is maintained. Typically, the combined reduction outlet gas stream enters cooler 36 at a temperature of from 500 to 1000° F. (260 to 538° C.), and exits cooler 36 at a temperature of from 300 to 500° F. (149 to 260° C.). In order to minimize the possibility of corrosion due to condensation of droplets of hydrochloric acid in the cooled reduction outlet gas stream, preferably the exit temperature of cooler 36 is not below the dew point of the combined reduction outlet gas stream. Because condensation of components of the combined reduction outlet gas stream is minimized, the concentrations of hydrogen chloride, chlorine, and water in the combined reduction outlet gas stream generally do not change by more than 5%, and preferably by not more than 1%, of their concentrations as a result of cooling in cooler 36.

The cooled reduction outlet gas stream flows through the line 37 to the lower retention chamber 50 and enters the space 44 defined by the annular baffle 46 and the wall of lower retention chamber 50. The cooled reduction outlet gas stream is distributed downwardly through the space 44. At the bottom of the annular baffle 46, the stream reverses direction and flows inwardly and upwardly into catalyst bed 42, passing countercurrently to the movement of catalyst. Some of the chloro-species in the stream are sorbed on the catalyst. Some of the water in the stream may also be sorbed on the catalyst, because water competes with chloro-species for sorptive sites on the catalyst. The upwardly flowing stream that exits from the catalyst bed 42, which is referred to as the sorption outlet gas stream, enters the third reforming reactor 45. The sorption outlet gas stream combines with the effluent stream from the third reforming reactor 45 and passes to the product separation facilities mentioned previously. The product separation facilities typically recover some of the sorption outlet gas stream in the recycle gas stream, and therefore some of the sorption outlet gas stream can form a portion of the reduction inlet stream.

The operating conditions of catalyst bed 42 are sufficient to perform three functions: purging hydrocarbons from the spent catalyst, cooling the catalyst from reforming reaction temperature to sorption temperature, and sorbing chloro-species from the cooled reduction outlet gas stream. The operating conditions of catalyst bed 42 include a temperature of generally from 150 to 900° F. (66 to 482° C.), and preferably from 300 to 500° F. (149 to 260° C.) a pressure of generally from 0 to 500 psi (0 to 3447 kPa) absolute and preferably from 1 to 3 psi (6.9 to 21 kPa) higher than the pressure of the third reforming reactor 45, a gas hourly space velocity of generally from 5 to 20000 $hr^{-1}$ and preferably from 10 to 1000 $hr^{-1}$, a ratio of the thermal mass flow rate of gas to the thermal mass flow rate of catalyst of generally from 1.0:1 to 2.0:1 and preferably from 1.25:1 to 1.5:1, and a catalyst residence time of generally from 0.1 to 10 hours and preferably less than 2 hours.

The sorption outlet gas stream that exits the catalyst bed 42 generally has a lower concentration of chloro-species than the concentration of chloro-species in the cooled reduction outlet gas stream. The concentration of hydrogen chloride in the sorption outlet gas stream is generally from 10 to 1000 mol-ppm and preferably from 50 to 500 mol-ppm. The concentration of chlorine In the sorption outlet gas stream is generally from 1 to 100 mol-ppm, and preferably from 1 to 10 mol-ppm. The concentration of water in the sorption outlet gas stream can vary depending on the operating conditions of catalyst bed 42 and the capacity of the catalyst in bed 42 to sorb water. Although sorption of water onto the catalyst is not a necessary function of the catalyst bed 42, it is a preferred function. This is because in general in the embodiment of the invention shown in FIG. 1, the less the sorption of water onto the catalyst in catalyst bed 42, the higher is the concentration of water in the sorption outlet gas stream and the worse is the performance of the catalyst in the reforming reactors 30, 40, and 45. This is because the sorption outlet gas stream combines with the third reactor effluent stream from which the recycle gas stream is recovered, and because excessive concentrations of water in the recycle gas stream generally have a detrimental effect on the activity and yields of the reforming catalyst. Accordingly, the concentration of water in the sorption outlet gas stream is generally from 0.001 to 2.0 vol-% and preferably from 0.01 to 0.1 vol-%.

Figure 2:
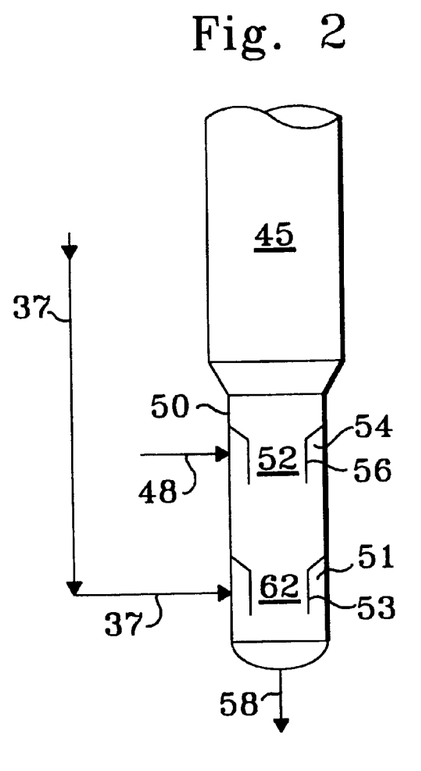
FIG. 2 shows another embodiment of the present invention by depicting the details of a portion of FIG. 1.

FIG. 2 illustrates an embodiment of the invention where the spent catalyst is purged of hydrocarbons in one catalyst bed and subsequently contacted with the cooled reduction outlet gas stream in another catalyst bed, in contrast to FIG. 1 where the spent catalyst is purged of hydrocarbons and contacted with the cooled reduction outlet gas stream in a single catalyst bed. Despite this difference, the process depicted in FIG. 2 is very similar to the process depicted in FIG. 1, and consequently parts of FIG. 1 correspond directly to parts of FIG. 2. Corresponding parts in FIGS. 1 and 2 have been given the same reference numbers. Accordingly, in the process depicted in FIG. 2, the lines 37 and 58, the third reforming reactor 45, and the lower retention chamber 50 interconnect with other lines and equipment that are shown in FIG. 1 but which for the sake of brevity are not shown in FIG. 2. Likewise, in order to avoid repetitious description, the detailed description of FIG. 2 that follows does not repeat the previous detailed description of the parts of the process of FIG. 1 that are not shown in FIG. 2.

Referring now to FIG. 2, spent catalyst particles flow from the bottom of the third reforming reactor 45, enter the lower retention chamber 50, and flow downwardly in a moving packed bed 52. In catalyst bed 52, which is formed in part by an annular baffle 56, hydrocarbons are purged from the catalyst. A purge stream enters lower retention chamber 50 through a line 48, passes through catalyst bed 52, and passes into third reforming reactor 45. After purging, the spent catalyst particles flow from the bottom of the catalyst bed 52 and downwardly in moving packed bed 62. In catalyst bed 62, which is formed in part by an annular baffle 62, chloro-species are sorbed on the catalyst. The cooled reduction outlet gas stream enters lower retention chamber 50 through the line 37, passes through the catalyst bed 62, passes through the catalyst bed 52, and passes into third reforming reactor 45. Chlorided catalyst particles flow from the bottom of the lower retention chamber 50 through the lower line 58. Cooling of the catalyst from reaction temperature to sorption temperature takes place in the catalyst bed 52, in the catalyst bed 62, or in both catalyst beds 52 and 62, depending on the operating conditions of the two beds.

The operating conditions of the catalyst bed 52 are sufficient to purge hydrocarbons from the spent catalyst, and, in addition, may be sufficient to cool the catalyst from reforming reaction temperature to sorption temperature or greater. These operating conditions of catalyst bed 52 include a temperature of generally from 150 to 900° F. (66 to 482° C.) and preferably from 300 to 500° F. (149 to 260° C.), a pressure of generally from 0 to 500 psi (0 to 3447 kPa) absolute and preferably from 1 to 3 psi (6.9 to 20.7 kPa) higher than the pressure of the third reforming reactor 45, a gas hourly space velocity of generally from 5 to 20000 $hr^{-1}$, and preferably from 10 to 1000 $hr^{-1}$, a ratio of the thermal mass flow rate of the gas to the thermal mass flow rate of the catalyst of generally from 1.0:1 to 2.0:1 and preferably from 1.25:1 to 1.5:1, and a catalyst residence time of generally from 0.1 to 10 hours and preferably from 2 to 4 hours. To the extent that these operating conditions refer to the flow of gas through the catalyst bed 52, these operating conditions include the total flow of gas through the catalyst bed 52 from both the purge stream and from the sorption outlet gas stream flowing upwards from catalyst bed 62 into catalyst bed 52. The purge stream, which is a portion of the recycle gas stream from the above-mentioned product separation facilities, enters the lower retention chamber 50 into the space 54, which is defined by the annular baffle 56 and the wall of the lower retention chamber 50. The purge stream enters the space 54 at a temperature of generally from 150 to 600° F. (66 to 316° C.) and preferably from 300 to 500° F. (149 to 260° C.). After purging, the catalyst particles leaving the bottom of the catalyst bed 52 are at a temperature of generally from 150 to 600° F. (66 to 316° C.) and preferably from 300 to 500° F. (149 to 260° C.), and have a water content of generally less than 1.0% by weight of the catalyst weight and preferably of less than 0.1% by weight of the catalyst weight.

The operating conditions of the catalyst bed 62 are sufficient to sorb chloro-species from the cooled reduction outlet gas stream, and, in addition, are sufficient to cool the catalyst from the catalyst outlet temperature of catalyst bed 52 to sorption temperature, if the catalyst outlet temperature of catalyst bed 52 is above the sorption temperature. The operating conditions of catalyst bed 62 include a temperature of generally from 150 to 900° F. (66 to 482° C.) and preferably from 300 to 500° F. (149 to 260° C.), a pressure of generally from 0 to 500 psi (0 to 3447 kPa) absolute and preferably from 0 to 10 psi (0 to 69 kPa) greater than the pressure of the catalyst bed 52, a gas hourly space velocity of generally from 5 to 20000 $hr^{-1}$, and preferably from 10 to 1000 $hr^{-1}$, a ratio of the thermal mass flow rate of the gas to the thermal mass flow rate of the catalyst of generally from 1.0:1 to 2.0:1 and preferably from 1.25:1 to 1.5:1, and a catalyst residence time of generally from 0.1 to 10 hours and preferably less than 2 hours. The cooled reduction outlet gas stream enters the lower retention chamber 50 into the space 51, which is defined by the annular baffle 53 and the wall of the lower retention chamber 50. The cooled reduction outlet gas stream enters the space 51 at a temperature of generally from 150 to 600° F. (66 to 316° C.) and preferably from 300 to 500° F. (149 to 260° C.). The concentration of hydrogen chloride, chlorine, and water in the sorption outlet gas, and the temperature and chloride content of the catalyst particles leaving the bottom of the catalyst bed 62 are generally the same as those previously described for the embodiment of this invention depicted in FIG. 1.

Figure 3:
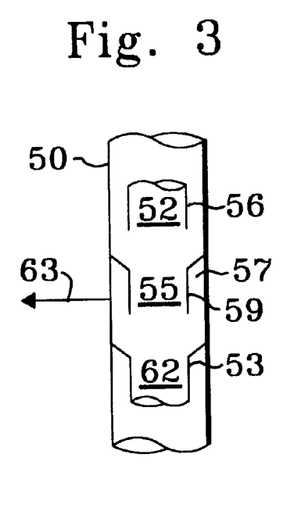
FIG. 3 shows yet another embodiment of the present invention by depicting the details of a portion of FIG. 2.

As in FIG. 2, FIG. 3 illustrates another embodiment of the invention in which the spent catalyst is purged of hydrocarbons in one catalyst bed and the spent catalyst is subsequently contacted with the reduction outlet gas stream in a second catalyst bed. In addition, in FIG. 3 some or all of the sorption outlet gas stream is withdrawn from the stacked reactor arrangement instead of being passed through the first catalyst bed for purging, as shown in FIG. 2. The process depicted in FIG. 3 is thus similar to the process depicted in FIG. 2, and parts of FIG. 2 correspond directly to parts of FIG. 3. In the process depicted in FIG. 3, the lower retention chamber 50, catalyst beds 52 and 62, and the annular baffles 53 and 56 interconnect or communicate with other parts that are shown in FIG. 2 but which are not shown in FIG. 3. The detailed description of FIG. 3 that follows also does not repeat description of those parts of the process of FIG. 2 that are not shown in FIG. 3.

Referring now to FIG. 3, after having been purged, spent catalyst particles flow from catalyst bed 52 downwardly through moving catalyst bed 55, and from there downwardly to moving bed 62. Annular baffle 59 and the wall of the lower retention chamber 50 in part define a space 57. Space 57 is a collection space for at least a portion, and preferably all, of the sorption outlet gas stream that flows upwards from catalyst bed 62. The catalyst in catalyst bed 55, which is formed in part by the annular baffle 59, functions as a restriction to the upward flow of at least a portion of the sorption outlet gas stream. Thus, rather than passing upwardly and inwardly through catalyst bed 55, at least a portion of the sorption outlet gas stream flows upwardly and outwardly into space 57 and exits the lower retention chamber 50 through a line 63. In a preferred method of operating this embodiment of this invention, all of the sorption outlet gas stream exits through the line 63. In order to ensure that none of the sorption outlet gas stream passes upward through catalyst bed 55, a portion of the purge stream that exits space 54 can flow downward and cocurrently through the moving catalyst bed 55. At the bottom of catalyst bed 55, this downwardly flowing portion of the purge stream reverses direction, flows outwardly and upwardly into space 57, combines with the sorption outlet gas stream, and exits the lower retention chamber 50 through the line 63.

The advantage of withdrawing the sorption outlet gas stream through the line 63 instead of passing the sorption outlet gas stream to the catalyst bed 52 arises particularly when the sorption outlet gas stream contains water which would cause detrimental effects on the catalyst performance in the reforming reactors. As mentioned previously, water present in the sorption outlet gas stream that passes into the catalyst bed 52 may ultimately appear in the recycle gas stream. In the case where that water would cause detrimental effects on the reforming catalyst's performance, it is advantageous to prevent some or all of the sorption outlet gas stream from passing into the catalyst bed 52. Expressed in another way, withdrawal of the sorption outlet gas stream is particularly advantageous when, at the sorption conditions in the catalyst bed 62, the catalyst bed 62 is not capable of sorbing sufficient water to prevent detrimental effects in the reactors if the water remaining in the sorption outlet gas stream was introduced into the reactors. Withdrawal of the sorption outlet gas stream is advantageous also when, even after sorption, introducing the chloro-species of the sorption outlet gas stream into the reactor effluent stream would result in an unacceptable concentration of chloro-species in the reactor effluent stream. In such a situation, it is preferable to withdraw the sorption outlet gas stream and to remove chloro-species by conventional means from such a relatively small volumetric stream rather than to introduce these chloro-species into the reactor effluent stream and then to remove the chloro-species from such a relatively large volumetric stream.

In the embodiment of this invention shown in FIG. 3, the operating conditions of the catalyst beds 52 and 62 are the same as those given previously for the embodiment of this invention shown in FIG. 2. In addition, however, a preferred method of operating the embodiment shown in FIG. 3 includes maintaining the pressure of the catalyst bed 55 at from 10 to 20 inches (254 to 508 mm) of water lower than the pressure of the catalyst bed 62 and at from 10 to 20 inches (254 to 508 mm) of water lower than the pressures of catalyst bed 52. When these pressure differences are maintained, most if not all of the sorption outlet gas stream and a portion of the purge stream will exit through the line 63.

EXAMPLES

Unless noted otherwise in the description of the examples that follows, each catalyst chloride result was obtained by analyzing one or more samples of catalyst on an as-received basis. In addition, the molar ratio of water per hydrogen chloride and the hydrogen chloride content of each gas mixture were computed by considering all chloro-species in the gas mixture as hydrogen chloride.

Three reforming catalysts were tested for chloride sorption. Catalysts 1, 2 and 3 had nominal compositions of about 0.38 wt-% platinum (volatile free) and 0.3 wt-% tin (volatile free) on a gamma alumina support. Catalysts 1 and 2 were fresh catalysts and had a nominal loss on ignition at 900° C. (1652° F.) of 0.5–1.5 wt-% and a nominal coke content of less than 0.1 wt-% (as received). Catalyst 1 had a surface area of 186 m$^2$/gram and a chloride content of 0.99 wt-%. Catalyst 2 had a surface area of 210 m$^2$/gram and a nominal chloride content of about 1.15 wt-%. Catalyst 3 was withdrawn from a commercial reforming process with a continuous regeneration section and had a loss on ignition at 900° C. (1652° F.) of 6.1 wt-%, a coke content of about 5 wt-%, a surface area of 113 m$^2$/gram, and a chloride content of 0.97 wt-%.

Example 1

Samples of Catalysts 1 and 3 were contacted with a gas mixture containing nitrogen, water, and hydrogen chloride. The gas mixture was prepared by vaporizing an aqueous hydrogen chloride solution and injecting it into a gas stream containing more than 99.9 mol-% nitrogen so that the gas mixture contained 10 mol-% water, had a molar ratio of water per hydrogen chloride of 12.5, and contained 800 mol-ppm hydrogen chloride. The sorption conditions included a temperature of 302° F. (150° C.), a pressure of 14.7 psi (101 kPa), and a superficial contact time of the gas mixture with the catalyst of 10 seconds. These sorption conditions were maintained for twelve hours. After twelve hours, the chloride content was 2.42 wt-% for the sample of Catalyst 1 and 1.87 wt-% for Catalyst 3.

Example 2

Samples of Catalysts 1 and 2 were contacted at the same sorption conditions as Example 1, except that the gas mixture contained carbon dioxide in addition to nitrogen, water, and hydrogen chloride. The gas mixture was prepared by vaporizing an aqueous hydrogen chloride solution and injecting it into a gas stream containing about 86 mol-% nitrogen and about 14 mol-% carbon dioxide so that the gas mixture contained 10 mol-% water, had a molar ratio of water per hydrogen chloride of 12.5, and contained 800 mol-ppm hydrogen chloride. After twelve hours of contacting, the sample of Catalyst 1 had a chloride content of 2.42 wt-%, which is the same as the chloride content of the sample of Catalyst 1 after contacting with nitrogen in Example 1. After twelve hours of contacting, the sample of Catalyst 2 had a chloride content of 2.57 wt-%.

Example 3

Samples of Catalysts 1 and 2 were contacted at the same sorption conditions as Example 1, except that the gas mixture had a molar ratio of water per hydrogen chloride of 24 instead of 12.5 and contained 417 mol-ppm hydrogen chloride instead of 800 mol-ppm. The gas mixture was prepared by vaporizing an aqueous hydrogen chloride solution, which was less concentrated in hydrogen chloride than the solution used in Example 1, and injecting it into a gas stream containing more than 99.9 mol-% nitrogen so that the gas mixture contained 10 mol-% water, had a molar ratio of water per hydrogen chloride of 24, and-contained 417 mol-ppm hydrogen chloride. After twelve hours of contacting, the sample of Catalyst 1 had a chloride content of 2.24 wt-% which is 0.18 wt-% lower than the chloride content of the sample of Catalyst 1 after contacting in Example 1. After twelve hours of contacting, the sample of Catalyst 2 had a chloride content of 2.43 wt-%.

Example 4

Samples of Catalysts 1 and 2 were contacted at the same sorption conditions as Example 1, except that the sorption temperature was 572° F. (300° C.) instead of 302° F. (150° C.). After twelve hours of contacting, the sample of Catalyst 1 had a chloride content of 1.80 wt-%, which is 0.62 wt-% lower than the chloride content of the sample of Catalyst 1 after contacting in Example 1. After twelve hours of contacting, the sample of Catalyst 2 had a chloride content of 1.97 wt-%.

Example 5

A sample of Catalyst 1 was contacted with a pretreating gas containing air, water, and hydrogen chloride. The pretreating gas was prepared by vaporizing a 0.6 M aqueous hydrogen chloride solution and injecting it into an air stream. The hydrogen chloride solution was injected at a liquid volumetric rate of 45 cc/hour into the air stream that was flowing at a gas volumetric rate of 3 liter/minute. The pretreatment conditions included a temperature of 977° F. (525° C.) and were maintained for two hours. After two hours, the chloride content of the sample of Catalyst 1 was 0.85 wt-%.

After pretreatment, the ample of Catalyst 1 was contacted at the same sorption conditions as Example 1, except that the gas mixture contained 5 mol-% water, the gas mixture had a molar ratio of water per hydrogen chloride of 300, the gas mixture contained 167 mol-ppm hydrogen chloride, and the sorption temperature was 482° F. (250° C.). After about four days of contacting, the sample of Catalyst 1 had a chloride content of 1.25 wt-%.

Examples 1 through 5 show that sorption results in a net increase in chloride content of all catalyst samples. The extent of increase in chloride content varies depending on the catalyst sample and the sorption conditions. Regarding the catalyst samples, the examples show that a fresh catalyst sample such as Catalyst 1 sorbs more chloride than a coke-containing low-surface-area catalyst sample such as Catalyst 3, and also that the higher the surface area of the catalyst sample, the more chloride is sorbed. Example 5 shows the sorption of a fresh catalyst sample following a pretreatment that oxidized the catalytic metal and removed chloride from the catalyst. Regarding the sorption conditions, the examples show that the lower the sorption temperature, the more chloride is sorbed, and also that the lower the water content of the contacting gas, the ore chloride is sorbed. Examples 1 and 2 show that at a given water content, however, he nitrogen content of the contacting gas does not have a significant effect on the amount of chloride sorbed, and thus at least partial substitution of nitrogen with another gas does not have a significant effect on the amount of chloride sorbed.

Example 6

A commercial unit for the dehydrogenation of $C_3$ and $C_4$ paraffins to produce olefins uses dehydrogenation catalyst particles in a series of side-by-side, moving-bed dehydrogenation reactors and moving-bed regeneration section. The last reactor in the series includes a lower retention chamber that contains a moving bed of dehydrogenation catalyst particles. A reduction zone is associated with the series of reactors. The reduction zone outlet gas stream, which comprises hydrogen, $C_1$–$C_5$ hydrocarbons, water, and hydrogen chloride, flows to the outlet line of the last reactor in the series, where it combines with the effluent stream of the last reactor in the series to form a combined stream. The combined stream passes to a product recovery section.

The commercial unit was modified so that the reduction zone outlet gas stream passed to a cooler where it was cooled, and then passed to the lower retention chamber. The dehydrogenation catalyst particles in the lower retention chamber sorbed a portion of the hydrogen chloride from the cooled reduction zone outlet gas stream. The outlet gas stream from the lower retention chamber passed to the bottom of the last reactor in the series, where it combined with the effluent stream of the last reactor to form a combined stream, which in turn passed to a product recovery section.

By routing the reduction outlet gas stream to the lower retention chamber instead of to the outlet line of the last reactor in the series, the concentration of hydrogen chloride in the combined stream to the product recovery section decreased.

What is claimed is:

1. A method for recovering chloro-species from a process for reducing a metal-containing catalyst, said method comprising:

(a) passing a reduction inlet stream comprising a reducing agent to a reduction zone containing said catalyst containing said metal and chloride, reducing at least a portion of said metal on said catalyst and removing at least a portion of the chloride from said catalyst in said reduction zone at reduction conditions, and withdrawing from said reduction zone a reduction outlet stream comprising said chloro-species; and (b) passing at least a first portion of said reduction outlet stream to a sorption zone containing said catalyst, sorbing at least a portion of said chloro-species on said catalyst in said sorption zone at sorption conditions, and withdrawing from said sorption zone a sorption outlet stream having a decreased concentration of said chloro-species relative to said reduction outlet stream.

2. The method of claim 1 wherein said first portion is an aliquot portion of said reduction outlet stream.

3. The method of claim 1 wherein said reduction inlet stream comprises a second portion of said reduction outlet stream.

4. The method of claim 1 wherein said catalyst comprises catalyst particles and further characterized in that said catalyst particles are moved at least periodically through said reduction zone and said sorption zone by withdrawing said catalyst particles from said sorption zone, passing said catalyst particles from said reduction zone to said sorption zone, and adding said catalyst particles to said reduction zone.

5. The method of claim 4 wherein said reduction inlet stream comprises a portion of said sorption outlet stream.

6. The method of claim 1 wherein said catalyst comprises alumina.

7. The method of claim 1 wherein said metal is at least one metal of the group consisting of platinum, iridium, rhodium, rhenium, palladium, gallium, germanium, potassium, indium and tin.

8. The method of claim 1 wherein said catalyst in said sorption zone has coke or carbon deposited thereon.

9. The method of claim 1 wherein said reducing agent comprises hydrogen.

10. The method of claim 1 wherein said chloro-species comprises chlorine or hydrogen chloride.

11. The method of claim 1 further characterized in that said sorption conditions comprise a decreased temperature relative to said reduction conditions.

12. The method of claim 1 further characterized in that said sorption conditions comprise a decreased pressure relative to said reduction conditions.

13. The method of claim 1 wherein said reduction outlet stream comprises water and further characterized in that at least a portion of the water in said first portion of said reduction outlet stream is sorbed on said catalyst in said sorption zone.

14. The method of claim 1 wherein at least a portion of the metal on said catalyst in said reduction zone is reduced.

15. The method of claim 1 wherein said catalyst comprises catalyst articles and further characterized in that said catalyst particles are contacted with hydrocarbons in a reaction zone to convert hydrocarbons and said catalyst particles are moved at least periodically through said reduction zone, said reaction zone, and said sorption zone by withdrawing said catalyst particles from said sorption zone, passing said catalyst particles from said reaction zone to said sorption zone, passing said catalyst particles from said reduction zone to said sorption zone, and adding said catalyst particles to said reduction zone.

16. The method of claim 1 wherein said catalyst comprises catalyst particles and further characterized in that said catalyst particles are contacted with an oxidizing agent in an oxidation zone to oxidize at least a portion of said metal and said catalyst particles are moved at least periodically through said oxidation zone, said reduction zone, and said sorption zone by withdrawing said catalyst particles from said sorption zone, passing said catalyst particles from said reduction zone to said sorption zone, passing said catalyst particles from said oxidation zone to said reduction zone, and adding said catalyst particles to said oxidation zone.

17. The method of claim 16 wherein said reduction inlet stream comprises a portion of said sorption outlet stream.

18. A method for recovering chloro-species from a reduction outlet stream of a reduction zone of a process for the catalytic conversion of a hydrocarbon feedstock in the presence of metal-containing catalyst particles, said method comprising:

(a) passing a hydrocarbon feedstock to a reaction zone, contacting said feedstock with said catalyst particles containing said metal in said reaction zone, and recovering a hydrocarbon product from said reaction zone;

(b) withdrawing said catalyst particles from said reaction zone and passing to a sorption zone at least a portion of said catalyst particles withdrawn from said reaction zone;

(c) passing at least a portion of a reduction outlet stream comprising hydrogen and said chloro-species to said sorption zone, sorbing said chloro-species on said catalyst particles in said sorption zone at sorption conditions, and withdrawing from said sorption zone a sorption outlet stream comprising hydrogen and having a reduced concentration of said chloro-species relative to said reduction outlet stream;

(d) passing said catalyst particles from said sorption zone to an oxidation zone and oxidizing at least a portion of the metal on said catalyst particles in said oxidation zone;

(e) passing said catalyst particles from said oxidation zone to a reduction zone;

(f) passing a reduction inlet stream comprising hydrogen to said reduction zone, reducing at least a portion of said metal on said catalyst particles and removing at least a portion of the chloride from said catalyst particles in said reduction zone at reduction conditions, and withdrawing from said reduction zone said reduction outlet stream; and (g) passing said catalyst particles from said reduction zone to said reaction zone.

19. The method of claim 18 further characterized in that at least a portion of said sorption outlet stream is passed to said reaction zone.

20. The method of claim 18 wherein said catalyst particles withdrawn from said reaction zone contain hydrocarbon, and further characterized in that said catalyst particles withdrawn from said reaction zone are passed to a purge zone, a purge inlet stream comprising hydrogen is passed to said purge zone, said catalyst particles in said purge zone are contacted with said purge inlet stream to remove hydrocarbons, and said catalyst particles are passed from said purge zone to said sorption zone.

21. The method of claim 20 further characterized in that at least a portion of said sorption outlet stream is passed to said purge zone.

22. The method of claim 20 further characterized in that a purge outlet stream comprising hydrocarbon is withdrawn from said purge zone and at least a portion of said purge outlet stream is passed to said reaction zone.

23. The method of claim 1 further characterized in that the sorption conditions comprise a sorption temperature of from 300° F. to 500° F.

* * * * *